US006470585B2

(12) United States Patent
Barr

(10) Patent No.: US 6,470,585 B2
(45) Date of Patent: Oct. 29, 2002

(54) MARKING DEVICE WITH INTEGRAL SELF-HINGED CONTACT PAD

(76) Inventor: William A. Barr, 5854 Buffalo River Rd., Earlysville, VA (US) 22936

(*) Notice: Subject to any disclaimer, the term of this patent is extended or adjusted under 35 U.S.C. 154(b) by 0 days.

(21) Appl. No.: 09/851,007

(22) Filed: May 8, 2001

(65) Prior Publication Data

US 2001/0027612 A1 Oct. 11, 2001

Related U.S. Application Data

(63) Continuation-in-part of application No. 09/258,874, filed on Feb. 26, 1999, now Pat. No. 6,226,822.

(51) Int. Cl.[7] .......................... G01B 1/00; B41F 31/00; B41K 1/42

(52) U.S. Cl. ......................... 33/528; 101/327; 101/333

(58) Field of Search .......................... 33/528, 333, 668, 33/768, 42, 666, 562, 563, DIG. 10; 101/327, 333

(56) References Cited

U.S. PATENT DOCUMENTS

| | | | | | |
|---|---|---|---|---|---|
| 3,745,664 | A | * | 7/1973 | Altseimer | 33/DIG. 10 |
| 3,913,235 | A | * | 10/1975 | Tenneson et al. | 33/DIG. 10 |
| 4,335,511 | A | | 6/1982 | Bowling | |
| 4,345,381 | A | * | 8/1982 | Brislin | 33/DIG. 10 |
| 4,372,050 | A | * | 2/1983 | Eisenhauer | 33/DIG. 10 |
| 4,519,143 | A | * | 5/1985 | Correlli | 33/189 |
| 4,589,211 | A | * | 5/1986 | Policka | 33/DIG. 10 |
| 4,735,143 | A | * | 4/1988 | Weir | 101/333 |
| 4,953,733 | A | | 9/1990 | Loscuito | |
| 4,969,269 | A | | 11/1990 | Dominguez | |
| 5,107,601 | A | | 4/1992 | Semchuck | |
| 5,471,930 | A | * | 12/1995 | Wood | 101/405 |
| 5,765,484 | A | * | 6/1998 | Lam | 101/327 |
| 5,791,252 | A | * | 8/1998 | Egan | 101/485 |
| 5,899,142 | A | * | 5/1999 | Suda et al. | 101/125 |

* cited by examiner

*Primary Examiner*—Diego Gutierrez
*Assistant Examiner*—Gail Verbitsky
(74) *Attorney, Agent, or Firm*—Sheldon H. Parker

(57) ABSTRACT

A marking device is disclosed to enable the placement of an indicator mark on one side of a sheet of material to mark the approximate periphery of a stationary object. The device consists of a base containing at least one inking transfer with a marking surface raised above the base surface. Multiple flexible self-hinges, each having a width, a thickness, a first end and a second end extend, from the first end, at an angle from the first surface of the base. Each of the self-hinges as a contact pad, positioned parallel to the base and adjacent to the second end of the self-hinge. The self-hinges extend from the base a distance sufficient to prevent the sheet material from contacting the inking transfer without the application of sufficient pressure to compress the self-hinges. In one embodiment, the base contains positioned to receive the self-hinges and contact pads during compression. The second surface of the base has affixing members to enable the base to be positioned on the item to be marked.

13 Claims, 2 Drawing Sheets

MARKING DEVICE WITH INTEGRAL SELF-HINGED CONTACT PAD

RELATE BACK TO PARENT APPLICATION

This application is a continuation in part of U.S. Application Ser. No. 09/258,874 filed Feb. 26, 1999 and issued as U.S. Pat. No. 6,226,822 Issued May 8, 2001.

BACKGROUND OF THE INVENTION

1. Field of the Invention

The invention relates to marking the backside of sheet material to enable openings to be accurately located and cut into the material.

2. Brief Description of the Prior Art

Plasterboard, also known as Sheetrock®, wallboard and gypsum board, has been used to replace plaster in construction for several decades. In comparison to plaster, plasterboard installs rapidly and requires substantially less manual labor. Plasterboard, however, still has installation problems which the industry has been attempting to solve.

Not the least of these problems is the marking of specific areas to be cut out. Currently these areas, such as for outlet boxes, heating vents, etc., are measured vertically and horizontally, from the adjacent plasterboard and floor or ceiling. The measurements are subsequently transferred to the plasterboard for cutting and installation. This is a time consuming process, even for professional installers. Plasterboard fortunately provides some leeway in that "mistakes" can be compensated through the use of spackle. The installation of wall paneling, however, does not provide any such leeway and a mistake in cutting can be quite costly.

The need for a rapid, easy to use marking device has been recognized in the construction field and is reflected in the prior art patents. U.S. Pat. No. 4,953,733 recognizes the need to mark plasterboard on the back side and has disclosed a device for use with electrical outlet boxes. The '733 device is provided with ears at each corner which fit within the outlet box. Arrow shaped marking elements are provided at the comers to engage the plasterboard. A securing screw can be inserted into a receiving hole within the body of the '733 device to secure the device to the outlet plug. Due to the construction of the '733 device, the marking elements are wedged into the plasterboard to mark the location of the plug outlet. Once the plasterboard is pressed onto the '733 device and removed for cutting the marking device is wedged into the plasterboard and must be removed prior to cutting the marked area. To prevent the device from being removed from the outlet with the plasterboard, the device must be secured through use of the securing screw. One of the problems with the '733 device is the necessity of securing the device to the outlet prior to measuring as well as removing the device after measuring, requiring substantial time on the part of the installer. Further, this device cannot be used on hard materials, such as paneling, tile or plywood. If the device is unsecured and retained within the plasterboard upon removal, the plasterboard must be maintained parallel to the wall during removal. Angling the plasterboard during removal could cause the ears of the device to catch on the outlet or even break up plasterboard.

U.S. Pat. No. 5,107,601, issued to Semchuck, uses a template consisting of indicia which define a hole pattern. These indicia are used to assist in drilling holes for mounting objects, such as towel bars. This device, however applies only to front mounted articles and does not provide any assistance with marking cut outs from the back of a rigid panel.

U.S. Pat. No. 4,969,269 discloses a device for punching cutouts through sheets of drywall. The '269 device has a pulley system which is used to cut the drywall in the shape of the outlet. The device is relatively expensive to produce and complicated to use.

U.S. Pat. No. 4,335,511 covers a marking device that marks the center of the outlet through use of a indicator which places an indentation in the wallboard at the center point of the outlet box. The wallboard is then horizontally placed, one half the depth of the wallboard is cut out in the shape of the outlet on the first side, the wallboard is turned over, and the remaining depth of the cutout is made. Cuts are made by striking the device that cuts into the wallboard. An inherent problem is that wallboard can break easily and unevenly when sharply struck, as it is brittle. Additionally, wallboard, is heavy and not easily moved or turned, rendering the '511 device awkward to use.

The disclosed invention overcomes the difficulties encountered in the prior art by providing a simple, inexpensive device for marking the reverse side of sheets of all types of material, such as paneling, plasterboard, floorboards, tiles, etc.

SUMMARY OF THE INVENTION

An easy to use and accurate marking device is disclosed to enable the placement of an indicator mark on one side of a sheet of material to mark the approximate periphery of a stationary object. The marking device consists of a base, preferably molded from plastic in a single piece mold, containing at least one inking transfer in a first surface of the base. The inking transfer has a marking surface maintained in and raised above the first surface to transfer a marking substance to the sheet of material upon contact. Multiple flexible self-hinges, each having a width, a thickness, a first end and a second end extend, from the first end, at an angle from the first surface of the base. Each of the self-hinges as a contact pad, positioned parallel to the base and adjacent to the second end of the self-hinge. The flexible self-hinges extend from the base a distance sufficient to prevent the sheet material from contacting the inking transfer without the application of sufficient pressure to compress the self-hinges. The compression required to place the sheet material in contact with the inking transfer is dependent upon the width and thickness of the flexible self-hinge. In one embodiment, the base contains positioned to receive the self-hinges and contact pads during compression. The second surface of the base has affixing members to enable the base to be positioned on the item to be marked.

The self-hinge and contact pad can be a single rectangular securing member or the contact pad can have a periphery greater than the width of the flexible self-hinge. The self-hinges can be positioned for the first end to extend from the base proximate the inking transfer or such that the second end is proximate the inking transfer.

BRIEF DESCRIPTION OF THE DRAWINGS

The advantages of the instant disclosure will become more apparent when read with the specification and the drawings, wherein.

DETAILED DESCRIPTION OF THE INVENTION

The disclosed marking device enables a user to rapidly and accurately mark sheets of material with the outline and location of an object positioned behind the material, once mounted. Although cutting plasterboard and paneling at the location of outlet boxes is an obvious use of the marking device, other uses, such as marking air ducts, water pipes, etc. will become evident to those skilled in the art. The marking can, if applicable, be placed on the front of a panel, or other material, to indicate the presence of an underlying object, such as a gas line. The following descriptions relate to the mounting of a rigid material, such as plasterboard or paneling. Other materials, however, can be marked in the same manner as described herein and additional uses for the device will be evident.

The standard practice for marking and cutting outlets and other items located within walls or floors was through measuring. For instance, to cut a sheet of plasterboard for an outlet, the user would measure from the floor to the outlet box and then from the nearest installed sheet or wall to the object. These measurements would then be transferred to the piece of plasterboard. In the transfer, the user must also remember to allow for any off sets required between the floor and the plasterboard. The disclosed device enables the user to place the device onto the outlet, press the plasterboard against the sheet and then cut around the outline. Several embodiments are disclosed that automatically accounts for the floor/plasterboard offset.

In co-pending application U.S. Ser. No. 09/258,874, filed Feb. 26, 1999, which is incorporated herein as though recited in full, an outlet device, and various embodiments, was disclosed. It has now been found that the full contact pad can be replaced with integral contact flanges, thereby dramatically reducing the cost.

Figure 1:
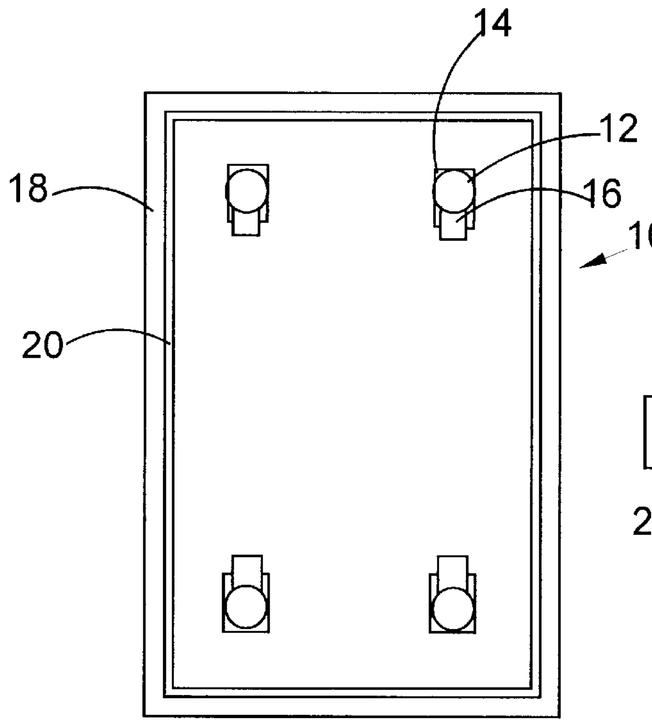
FIG. 1 is a front view of the disclosed marking device.
Figure 2:
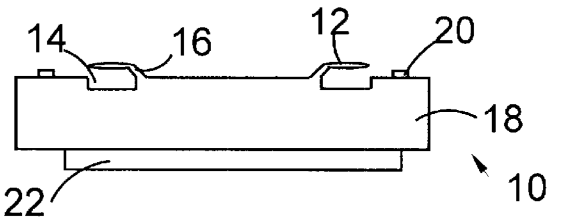
FIG. 2 is a cutaway side view of the marking device of FIG. 1.

The embodiment of the marking device 10 illustrated in FIGS. 1 and 2, is configured for use with outlet and switch boxes without the electrical components mounted. Alternate uses, as well as use of the device with mounted electrical components, are addressed in specific embodiments as disclosed in the foregoing co-pending application. The method of incorporating the improvements disclosed herein with the embodiments of the co-pending application will be obvious to those skilled in the art. The attachment flanges 22 on the back of the base 18 of the outlet device 10 are dimensioned to have an inner periphery approximately equal to the outer periphery of an outlet box. Other methods of attachment, as well as dimensions and placement of alternate attachment methods are disclosed in the co-pending application.

The actual marking of the sheet material is accomplished through use of an inking transfer 20 that extends around the periphery of the base 18 and, in this embodiment, forms an internal circuit around the base 18. The positioning of the inking transfer 20 on the base 18 is such that the mark left by the transfer is aligned with the periphery of the outlet box. The redesigning of the inking transfer 20 to match other configurations and other uses, will be obvious to those skilled in the art. The inking transfer 20 extends beyond the plane of the base 18 a distance sufficient to contact the plasterboard without interference. A portion of the inking transfer 14 is preferably recessed into an inking channel to allow the transfer 14 to hold sufficient ink for repeated uses without requiring re-inking. In alternative embodiments, the inking transfer can be broken lines, dots or any other configuration that is applicable to the end use. Although the continuous inking transfer is preferable, when the device has been modified for larger applications, the continuous line is not as critical.

In this embodiment, the base 18 has a rectangular periphery with the integral contact flanges 16, or self hinges, extending from one surface and the attachment flange 22 on the opposing surface. The attachment flanges 22 illustrated provide a friction fit with the outlet box to maintain the marking device 10 in position. Other methods for maintain the marking device 10 in position are disclosed in co-pending application and will be obvious to those skilled in the art.

The disclosed marking device relies on the use of materials, generally such as nylon, vinyl or hard rubber, that maintain a memory and have a high resistance to breakage after repeated flexing. The amount of pressure that is required to flex the self-hinges can be altered based upon thickness and width of the material. The self-hinges and contact pads disclosed herein are preferably molded as an integral unit with the base, thereby dramatically reducing the costs.

The marking device 10 uses angled self-hinges to distance the sheet material from the marking device 10 until the sheet is pressed into contact with the inking transfer 20. The self-hinges 16 illustrated in FIGS. 1 and 2 extend from the base 18 at an angle sufficient to place the contact pad 12 approximately parallel with the base 18. The degree of the angle will vary dependent upon the planned end use, and is generally in the range of about 25° to about 80°. Although the contact pads 12 do not need to extend substantially beyond the inking transfer 20, the contact pads 12 must prevent the sheet material from unintentionally contacting the inking transfer 20 while the sheet material is being aligned for installation. A distance of about ⅛ to about ¼ inch will be sufficient in most embodiments, however in some end uses the dimensions can require adjusting. In this embodiment, receiving areas 14 are placed below the contact pad 12 and integral flanges 16 to enable the pad 12 and self-hinges 16 to recess into the receiving area 14, thereby enabling the inking transfer 20 to contact the sheet material. The recesses 14 are necessary when the inking transfer 20 material is soft and depresses to almost flush with the base 18. In instances where the material making up the inking transfer 20 has a rigidity that prevents the sheeting material from coming adjacent to the base 18, the recesses can be eliminated. These embodiments are illustrated hereinafter.

If the sheet is not prevented from being marked upon initial contact, the surface of the plasterboard could be marked one or more times, or the markings smeared, during the alignment process. Therefore, it is critical that the contact pads 12 extend a sufficient distance beyond the inking transfer 20 to prevent the inking transfer 20 from contacting the sheet material until the sheet is in position. The self-hinges 16 must provide sufficient resistance to prevent the contact incurred during the positioning of the sheeting from depressing the self-hinges 16 and causing inadvertent contact. To avoid this, it is preferable that the self-hinges 16 require sufficient pressure to be applied to the surface of the sheet proximate the outlet prior to contact with the inking transfer 20. The amount of pressure will be dependent upon the weight of the sheet material and for marking devices with specific end uses the pressure can be adjusted during manufacture. For example, paneling weighs only about 30 to 40 pounds per panel and would therefore require less resistance to maintain the sheet away from the inking transfer during alignment. Sheetrock, or other heavy sheet materials, however, weighs about 40–100 pounds and more in the larger sizes. For marking devices that are to be usable with sheetrock, the pressure required to compress the self-hinges would be substantially greater than the pressure required for paneling. As a general use for homeowners self-hinges requiring about 10 to 30 pounds of pressure to place the sheet material in contact with the inking transfer would be applicable.

Figure 3:
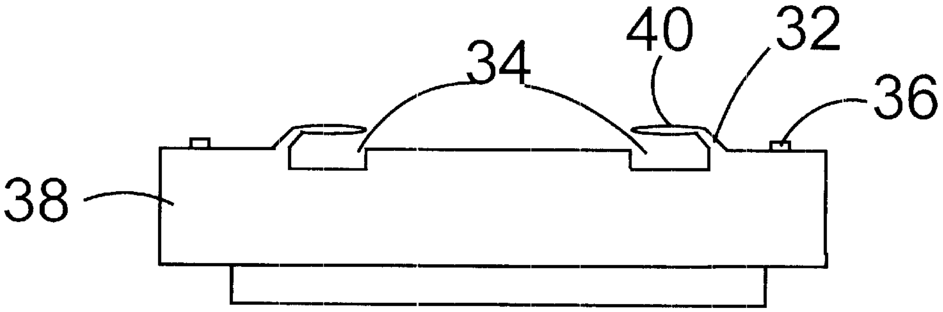
FIG. 3 is a cutaway side view of an alternate embodiment of the marking device.

In FIG. 3, the self-hinges 32 have been reversed from the embodiment of FIGS. 1 and 2. In this embodiment, the self-hinges 32 extend from the base 38 proximate the inking transfer 36. This embodiment incorporates the use of the recesses 34.

Figure 4:
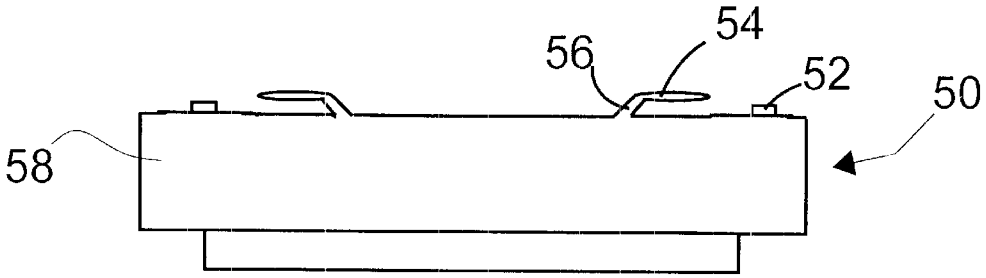
FIG. 4 is a cutaway side view an additional embodiment of the marking device.

In FIG. 4 the prior recesses have been eliminated and the self-hinges 56 and contact pads 54 lie flush with the base 58 when the sheet material is pressed toward the inking transfer 52. It should be noted, that the inking transfer material 52 in this embodiment must have sufficient rigidity to remain above the compressed contact pad 54. If the inking transfer material 52 is too pliable, the material 52 will continue to compress until the sheet material is adjacent to the compressed contact pads 54 and an incomplete mark will be left on the material.

Figure 5:
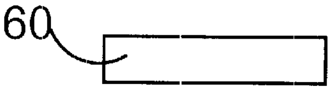
FIG. 5 is a top view of an alternate spring design.
Figure 6:
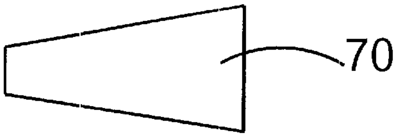
FIG. 6 is a top view of an additional spring design.

In FIGS. 5 and 6 alternate designs for the self-hinge/contact pad are disclosed. In FIG. 5, the self-hinge and contact pad 60 are a rectangles while in FIG. 6 the contact pad portion of the self-hinge/contact pad 70 is a modified triangle. It should be noted that these are examples of designs, along with the circular contact pad 12 disclosed heretofore, and should not be considered to limit the scope of the patent.

Although the preferred method of marking is through the use of ink, and reference is made to the inking transfer herein, other materials that will leave a mark can be used, such as chalk or lead. The powdered materials would be retained in a flexible holder with holes sufficient to permit the powder to exit the holder when the plasterboard was pressed against the device.

It should be obvious to anyone skilled in the art that the dimension of any of the foregoing embodiments can be altered for use with other specific sized outlets, such as double receptacle outlets, car stereo cutouts, A/C inlet/outlets, etc. Additionally, any of foregoing can be offset to compensate for the plasterboard/floor clearance. It will also be evident that the size of the flanges can vary and that the channel attachment can replace the friction fit of the flanges in any of the embodiments.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A marking device for placing an indicator mark on one side of a sheet of material to mark the approximate periphery of a stationary object, said marking device having:

a base, said base having a first surface and a second surface;

at least one inking transfer, each of said at least one inking transfer having a marking surface maintained in and raised above said first surface of said base to transfer a marking substance to said sheet of material upon contact with said sheet of material, at least one flexible-self-hinge, each of said at least one flexible self-hinge having a width, a thickness, a first end and a second end, said first end extending at an angle from said first surface of said base;

at least one contact pad, said contact pad being parallel to said base and adjacent to a second end of said self-hinge, and affixing members, said affixing members extending from said second surface of said base;

wherein each of said at least one flexible self-hinge extends from said base a distance sufficient to prevent said sheet material from contacting said at least one inking transfer without the application of pressure to compress each of said at least one flexible self-hinge.

2. The device of claim 1 further comprising at least one recess within said base, each of said at least one recess being positioned to receive said at least one self-hinge and said contact pad during compression.

3. The device of claim 1 wherein said marking device is manufactured from a plastic.

4. The marking device of claim 3 wherein said base, each of said at least one self-hinge and each of said at least one contact pad are molded from a single mold.

5. The marking device of claim 1 wherein each of said self-hinge and each of said contact pad are a single rectangular securing member extending from said base plate.

6. The marking device of claim 1 wherein said contact pad has a periphery greater than said width of said flexible self-hinge.

7. The marking device of claim 1 wherein the compression required to place said sheet material in contact with said inking transfer is dependent upon said width and said thickness of said flexible self-hinge.

8. The marking device of claim 1 wherein each of said at least one flexible self-hinge first end extends from said base proximate said inking transfer.

9. The marking device of claim 1 wherein each of said at least one flexible self-hinge second end is proximate said inking transfer.

10. A marking device for placing an indicator mark on one side of a sheet of material to mark the approximate periphery of a stationary object, said marking device being a single piece, molded material having a memory and having:

a base, said base having a first surface and a second surface;

at least one inking transfer, each of said at least one inking transfer having a marking surface maintained in and raised above said first surface of said base to transfer a marking substance to said sheet of material upon contact with said sheet of material, at least one flexible self-hinge, each of said at least one flexible self-hinge having a width, a thickness, a first end and a second end, said first end extending at an angle from said first surface of said base;

at least one contact pad, said contact pad being parallel to said base and adjacent to a second end of said self-hinge, and affixing members, said affixing members extending from said second surface of said base; wherein each of said at least one flexible self-hinge extends from said base a distance sufficient to prevent said sheet material from contacting said at least one inking transfer without the application of pressure to compress each of said at least one flexible self-hinge, said pressure to compress each of said at least one flexible self-hinge being dependent upon said width and said thickness of each of said at least one flexible self-hinge.

11. The device of claim 10 further comprising at least one recess within said base, each of said at least one recess being positioned to receive said at least one self-hinge and said contact pad during compression.

12. The method of marking a sheet of material with an outline of a stationary object's position using a marking device having a base, a marking line to transfer a mark onto said sheet of material, and at least one flexible, integral self-hinge having a contact surface extending from a first surface of said base, comprising the steps of:

securing said base to an exposed edge of said stationary object, placing said sheet of material against said contact surface, applying pressure to said material, compressing each of said at least one flexible self-hinge;

causing said marking line to come in contact with said sheet of material;

removing said sheet of material.

13. The method of claim 12 further comprising the step of recessing each of said at least one flexible self-hinge and contact surface into a receiving area to enable each of said at least one flexible self-hinge and contact surface to be flush with said first surface of said base.

* * * * *